United States Patent
Cohen et al.

(10) Patent No.: US 10,423,916 B1
(45) Date of Patent: Sep. 24, 2019

(54) METHOD FOR GENERATING DEVELOPER PERFORMANCE RATINGS

(71) Applicant: DEEPCODING LTD., Tel Aviv (IL)

(72) Inventors: Ronen Cohen, Gesher Haziv (IL); Sebastien Adjiman, Tel Aviv (IL); Arnon Yaffe, Tel Aviv (IL)

(73) Assignee: DEEPCODING LTD., Tel Aviv (IL)

( * ) Notice: Subject to any disclaimer, the term of this patent is extended or adjusted under 35 U.S.C. 154(b) by 0 days.

(21) Appl. No.: 15/920,546

(22) Filed: Mar. 14, 2018

(51) Int. Cl.
*G06F 9/44* (2018.01)
*G06Q 10/06* (2012.01)

(52) U.S. Cl.
CPC .............. *G06Q 10/06398* (2013.01)

(58) Field of Classification Search
CPC ................................. G06Q 10/06398
USPC .................. 717/101–110, 120–121
See application file for complete search history.

(56) References Cited

U.S. PATENT DOCUMENTS

| | | | | |
|---|---|---|---|---|
| 5,446,895 A * | 8/1995 | White | ............... | G01R 31/00 717/101 |
| 7,055,129 B2 * | 5/2006 | Ball | ............... | G06F 11/3616 714/E11.22 |
| 7,103,562 B2 * | 9/2006 | Kosiba | ............... | G06Q 10/04 705/7.38 |
| 7,930,193 B2 * | 4/2011 | Marx | ............... | G06F 19/321 705/2 |
| 8,108,250 B1 * | 1/2012 | Moore | ............... | G06Q 10/0639 700/111 |
| 8,122,425 B2 * | 2/2012 | Corral | ............... | G06Q 10/06 717/101 |
| 8,190,468 B1 * | 5/2012 | Drew | ............... | G06Q 10/06 705/7.42 |
| 8,276,112 B2 * | 9/2012 | Fritzsche | ............ | G06F 11/3447 717/104 |
| 8,352,914 B2 * | 1/2013 | Sarkar | ............... | G06Q 99/00 717/121 |
| 8,423,954 B2 * | 4/2013 | Ronen | ............... | G06F 8/36 717/107 |
| 8,856,725 B1 * | 10/2014 | Anderson | ............ | G06F 8/75 717/103 |
| 9,614,961 B2 * | 4/2017 | Riefel | ............... | H04M 3/00 |
| 2003/0078804 A1 * | 4/2003 | Morrel-Samuels | ............... | G06Q 10/0639 705/7.42 |

OTHER PUBLICATIONS

Malin, "Evaluating Student Employee Performance", ACM, pp. 214-218, 2006 (Year: 2006).*
Fenner et al, "Computerized Performance Monitoring and Performance Appraisal", ACM, pp. 25-29, 1990 (Year: 1990).*

(Continued)

*Primary Examiner* — Anil Khatri
(74) *Attorney, Agent, or Firm* — Pearl Cohen Zedek Latzer Baratz LLP

(57) ABSTRACT

A computer implemented method for generating a performance rating for a developer may include monitoring developer activities to obtain near real-time activity data; exploring the near real-time activity data to identify entities; structuring the near real-time activity data into data-frame objects; performing a feature engineering procedure to measure representative behaviors of the developer and performing a performance analysis to produce performance rating of the developer.

14 Claims, 10 Drawing Sheets

(56) References Cited

OTHER PUBLICATIONS

Beaver et al, "The Effects of Development Team Skill on Software Product Quality", ACM, pp. 1-5 (Year: 2006).*
Raza et al, "ProcessPAIR: A Tool for Automated Performance Analysis and Improvement Recommendation in Software Development", ACM, pp. 798-803 (Year: 2016).*
Matsumoto et al, "An Analysis of Developer Metrics for Fault Prediction", ACM, pp. 1-9 (Year: 2010).*
Lin et al, "Staffing Level and Cost Analyses for Software Debugging Activities Through Rate-Based Simulation Approaches", IEEE, pp. 711-724 (Year: 2009).*

* cited by examiner

400

| line | session id | module | activity_activity_name | activity type | content id | action | dcontent content_type unique_content_id | status | user |
|---|---|---|---|---|---|---|---|---|---|
| 1 15-aug | 2 | ORBDataManager | 14 | loading aggregation | rep_trans | 1 | aggregation"rep_trans progress | in | Robert |
| 2 15-aug | 2 | ORBDataManager | 14 | loading aggregation | rep_trans | 8 | aggregation"rep_trans progress | in | Robert |
| 3 15-aug | 2 | ORBDataManager | 14 | loading aggregation | rep_trans | 0 | aggregation"rep_trans progress | in | Robert |
| 4 15-aug | 2 | ORBDataManager | 14 | loading aggregation | rep_trans | 20 | aggregation"rep_trans progress | in | Robert |
| 5 15-aug | 2 | ORBDataManager | 14 | loading aggregation | rep_trans | 0 | aggregation"rep_trans progress | in | Robert |
| 6 15-aug | 2 | ORBDataManager | 14 | loading aggregation | rep_trans | 0 | aggregation"rep_trans progress | in | Robert |

Figure 4

| user | project | automation | completion | compliance | confidence_level | dev_rate | developer_speed | diversity | error_rate |
|---|---|---|---|---|---|---|---|---|---|
| Amy | 1 | 80 | 60 | 100 | 80 | 100 | 80 | 80 | 140 |
| Anthony | 2 | 100 | 60 NA | | 140 | 140 | 60 | 80 | 120 |
| Barbara | 3 | 60 | 60 NA | | 100 | 100 | 80 | 60 | 140 |
| Bob | 4 | 120 | 60 | 100 | 80 | 60 | 100 | 120 | 140 |
| Daniel | 5 | 140 | 60 | 140 | 100 | 60 | 100 | 100 | 100 |
| David | 6 | 120 | 60 NA | | 80 | 140 | 60 | 60 | 140 |
| George | 7 | 80 | 60 | 120 | 60 | 60 | 60 | 120 | 140 |
| Jacob | 8 | 140 | 60 | 60 | 140 | 120 | 120 | 120 | 80 |
| Jennifer | 9 | 60 | 60 | 140 | 60 | 80 | 100 | 60 | 120 |
| John | 10 | 60 | 60 | 60 | 80 | 140 | 60 | 100 | 60 |
| Linda | 11 | 80 | 60 | 120 | 120 | 80 | 120 | 140 | 80 |

| EXPERTISE | DEVELOPER: DAVID (1) ▽ | |
|---|---|---|
| YOU DEMONSTRATED MORE EXPERTISE IN DEVELOPING REPORTS THAN | 35.00% | OF ACME DEVELOPERS |
| ON AVERAGE YOU DID | 0.03 | ERRORS DAY. |
| AUTOMATION INDEX IS | 1.12 | HIGH INDEX SHOWS WORKFLOW UTILIZATION TO AUTOMATE YOUR WORK |
| DIVERSITY INDEX IS | 1.33 | HIGH INDEX SHOWS FAMILIARITY WITH THE SYSTEM FUNCTIONALITY |
| MODELING INDEX IS | 0.5 | HIGH INDEX SHOWS DATA MODELING PROICIENCY |
| CONFIDENCE RATE IS | 24.52% | IS THE RAT OF PROCESSING ACTIVITIES TO REVIEW ACTIVITIES |
| YOUR MODULARITY INDEX IS | 0.67 | HIGH INDEX SHOWS THAT YOU SUB-OBJECTS LIKE DATA MODEL AGGREGATION ETC.. TO BUILD YOUR REPORTS |
| RECOMMANDATION | | |
| TRAINING ON VALIDATION | | |
| TRAINING ON FILTER | | |
| SPEND LESS TIME REVIEWING DATA | | |

| | | |
|---|---|---|
| DEVELOPER: BARBARA | | (1) ▷ |

| | | | |
|---|---|---|---|
| PRODUCTIVITY | | | |
| YOU WERE MORE PRODUCTIVE THAN | 30.00% | | OF ACME DEVELOPERS |
| ON AVERAGE YOU SPENT | 1.2 | | HOURS PER DAY, PROCESSING DATA |
| AVG. DEVELOPMENT RATE IS | 0.88 | | TOTAL PROCESSING DIVIDED BY TOTAL OBJECTS PER DAY |
| YOUR SPEED IS | .95 | | SECONDS AS MEASURED BY THE AVG. ELAPSED TIME BETWEEN ACTIONS |
| RECOMMANDATION | | | |
| SPEND MORE TIME PROCESSING DATA | | | |

METHOD FOR GENERATING DEVELOPER PERFORMANCE RATINGS

BACKGROUND OF THE INVENTION

Field of the Invention

The invention relates generally to data analysis, and more specifically to a method for generating developer performance ratings.

Description of the Background Art

Various IT data centric projects, such as Enterprise Resource Planning (ERP), regulatory reports creating in the domain of operational risk management, and creation of product catalogs like Amazon and eBay, carry different level of risks, such as the project may not be completed on time, within the budget and with the promised quality.

The performance of a developer plays a prominent role in making the project successful.

Performance evaluation programs are frequently used by organizations, such as companies and government agencies, to evaluate employee performance and determine compensation for employees. In a typical performance evaluation program, performance is measured based on establishing a goal for the evaluation time period. When an employee meets the goal, an incentive is awarded to the employee. As a result, once an employee has met the goal, he or she has no incentive to achieve a higher performance. In a similar fashion, an employee that is far from reaching the goal has no incentive to work toward a higher performance.

The developer performance is one of the prominent factors to influence the risk level of a project. The closer an employee is to a target, the more motivated he or she will be to achieve the target. In addition, employees who are far above or below a target should be provided with an incentive to continue improving because the organization will benefit from their efforts.

SUMMARY OF THE INVENTION

The invention rates the developer's performance, suggests recommendations in the spirit of how the developer can improve his performance, and by so, helps the manager to allocate developers to projects, in an optimized way.

Some embodiments of the present invention provide a computer implemented method for generating a performance rating for a developer. The method may include the following steps: monitoring developer activities to obtain near real-time activity data; receiving at least one process-flow specific to a development process; exploring the near real-time activity data, to identify entities based on the at least one process flow; structuring the near real-time activity data into data-frame objects, based on the identified entities; receiving at least one performance metric and at least one measurement related to the at least one performance metric; performing a feature engineering procedure to measure representative behaviors of the developer, related to the at least one measurement and the at least one performance metric; receiving a number of performance levels for the at least one performance metric; receiving a performance scoring scale and performing a performance analysis on the measured representative behaviors to produce performance rating of the developer.

BRIEF DESCRIPTION OF THE DRAWINGS

The subject matter regarded as the invention is described in detail and distinctly claimed in the concluding portion of the specification. The invention, however, both as to organization and method of operation, together with objects, features, and advantages thereof, may best be understood by reference to the following detailed description when read with the accompanying drawings in which:

FIG. 4 illustrates one embodiment of an analysis base table, according to the present invention;

FIG. 5 illustrates one embodiment of a performance scoring table, according to the present invention;

FIG. 7 illustrates on embodiment of a scorecard of a developer, for the expertise metric, according to the present invention;

FIG. 8 illustrates on embodiment of a scorecard of a developer, for the productivity metric, according to the present invention.

Figure 1:
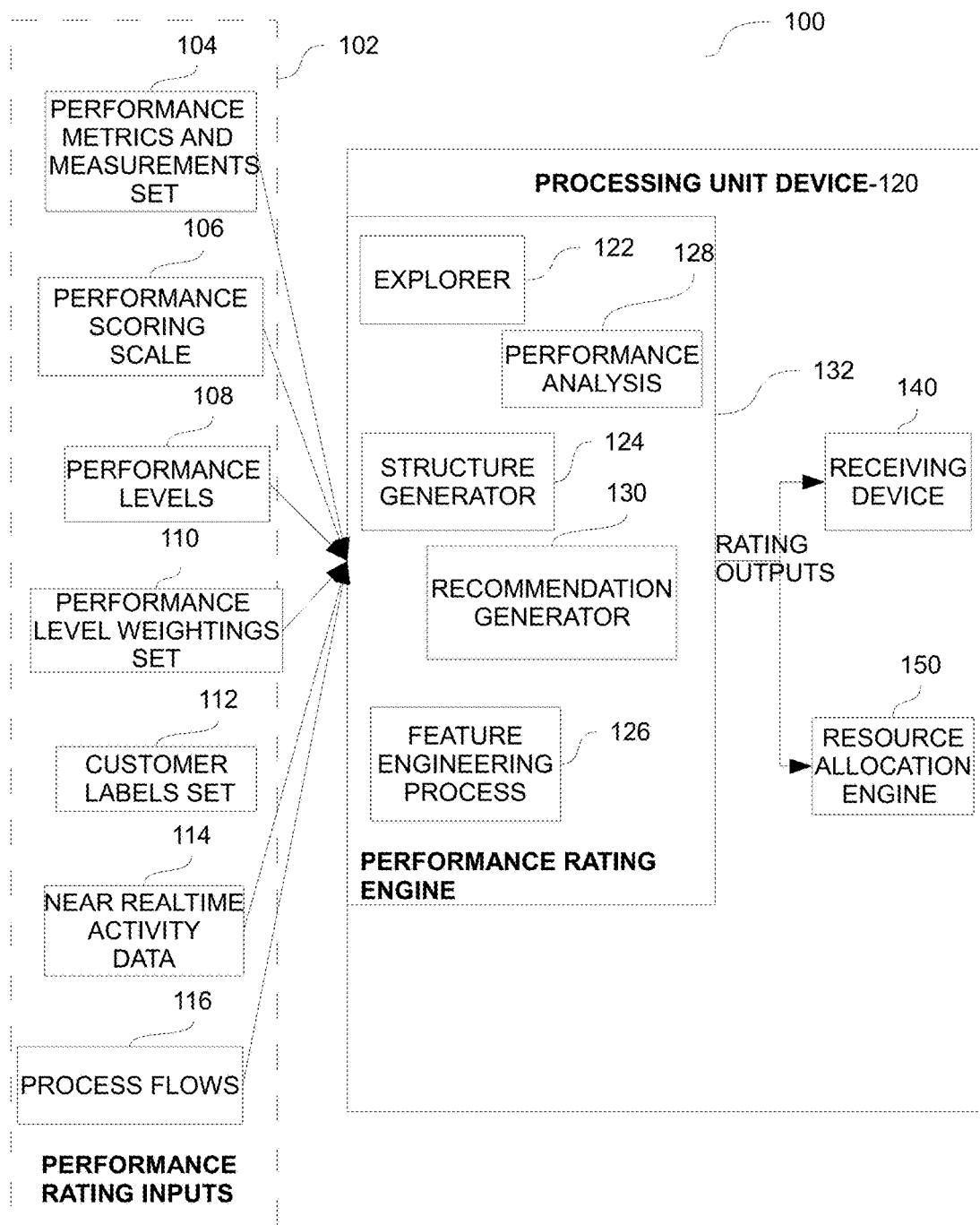
FIG. 1 is a block diagram illustrating one embodiment of a performance rating system, according to the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The present invention provides a method for rating developer performance, suggesting recommendations in the spirit of how the developer can improve his performance, and, by doing so, enabling optimization of the allocation of developers to projects and tasks.

FIG. 1 is a block diagram illustrating a performance rating system 100, according to some embodiments of the present invention. Performance rating system 100 implements a performance rating engine that uses information from past transactions involving the developers being rated to compute a performance scoring and rating for each developer. The term "developer" as used herein refers to an Information Technology (IT) professional services developer, tester, or architect.

The term "vendor" as used herein refers to a company that sells the software/application that the developer implements.

The term "outlier" as used herein refers to a piece of data or observation that deviates drastically from the given norm or average of the data set.

The term "outlier detection" as used herein refers to a process of detecting and subsequently excluding outliers from a given set of data.

The term "correlation analysis" as used herein refers to a method of statistical evaluation used to study the strength of a relationship between two or more measurements.

The term "near real-time" or "nearly real-time" (NRT), in telecommunications and computing, refers to the time delay introduced, by automated data processing or network transmission, between the occurrence of an event and the use of the processed data, such as for display or feedback and control purposes.

Performance rating system 100 may include performance rating inputs 102 and a processing unit device 120, which further may include a performance rating engine 132, a resource allocation engine 150 and a receiving device 140. Performance inputs 102 may include a set of performance metrics and measurements for each performance metric 104, performance scoring scale 106, a set of performance levels for each metric 108, a set of performance level weightings 110, a set of customer labels 116, near real-time activity data 114 and process flows 116. Each of the performance rating inputs 102 is discussed below in further detail in conjunction with FIGS. 2-10. Near real-time activity data 114 may include any information from near real-time activity data derived from the monitoring of the developer being rated, during its daily activity, when using a dedicated application.

Processing unit device 120 may be any type of processing unit device having a processor, a memory configured to store software and one or more input/output devices. Some examples of processing unit devices include personal computers, laptop computers, network-based computers and hand-held computing devices.

Performance rating engine 132 may include an explorer 122, a structure generator 124, a feature engineering process 126, a performance analysis 128 and a recommendation generator 130. Each of these elements is discussed below in further detail in conjunction with FIGS. 2-10.

Resource allocation engine 150 is a component designed for resource allocation of developers when there is a need to add resources to an existing project or to allocate resources to a new project. Resource allocation engine 150 may be based on linear optimization algorithm, to allocate developers based on the performance rating outputs and a set of constraints required by the project such as the type of expertise of a developer, the time constraint, the complexity, among other constraints.

Receiving device 140 receives the rating outputs from the performance rating engine 132. Receiving device 140 may be any device capable of receiving the performance rating outputs, including any type of computer monitor or other, printer or other printing device or display device or storage medium or other storage device.

Figure 2:
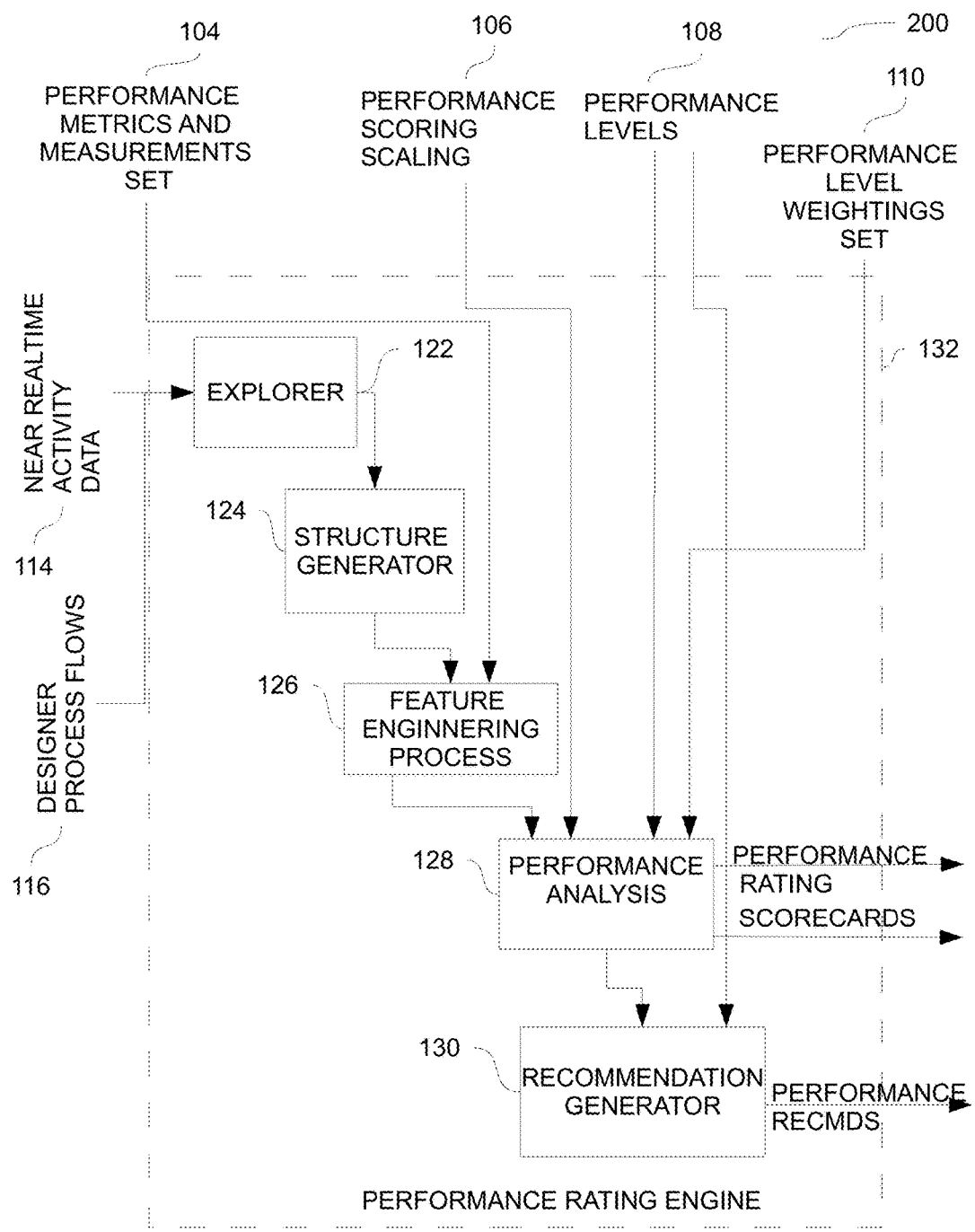
FIG. 2 is a functional block diagram of another embodiment of a performance rating engine of FIG. 1, according to the present invention.

FIG. 2 is a functional block diagram of performance rating engine 200, according to some embodiments of the present invention. According to some embodiments, a data scientist may set the set of performance metrics and measurements for each performance metric 104, the performance scoring scale 106, a set of performance levels for each metric 108, a set of performance level weightings 110. The process flows 116 may be designed by a system architect. Near real-time activity data 114 relating to the developers to be rated may be entered into the performance rating engine 132.

Set of performance metrics and set of measurements 104 embodies the criteria that the IT manager uses to rate the different developers and forms the frame work of the performance rating engine 132. The designer of the performance rating engine, therefore, structures set of performance metrics and performance measurements 104 to reflect factors related to developer performance that are dependent on the applications used by the developer. For example, performance metrics may include expertise, productivity, complexity and quality, among others.

For example, the expertise metric may include any of the following measurements, among others:

error rate—referring to what degree the developer produces error, such as the average number of errors per day.

automation—referring to how efficient is the developer in creating reports, such as the number of workflows divided by the number of reports.

confidence level—referring to how confident is the developer in what he is developing, such as the number of data processing activities divided by the number of data review activities.

modeling—referring to data modeling proficiency, such as the number of data sources divided by the number of data model.

modularity—referring to how the developer is handling complexity.

For example, the productivity metric may include any of the following measurements, among others:

developer speed—referring how intensively the developer is working, such as the average elapsed time between developer actions.

development rate—referring how productive is the developer, such as the number of objects divided by the total development hours per day.

processing—referring how productive is the developer, such as the average number of hours per day spent in processing data.

For example, the complexity metric may include any of the following measurements, among others:

compliance—referring to how messy is the input data, such as the number of validation exceptions and group exceptions that were violated.

source count—referring to how complex is the input data, such the as number of data sources.

freeform complexity—referring to how complex is the freeform report.

tabular complexity—referring to the time spent on the longest report.

Explorer 122 may be configured to receive the near real-time activity data 114 and the process flows 116 to identify the main entities that participate in the development process. The main identities may be, for example, activity types, objects types to be developed, and the outputs that were created, among others. The functionality of the explorer 122 may be implemented in hardware and/or software, using any visual tool.

Given the understanding that resulted from the exploration step, structure generator 124 may extract the entities identified and verified by the vendor and may transform the near real-time data into data-frame objects based on the identified identities, where each column may represent a measurement and each row may be an observation According to some embodiments, data cleansing may be applied, to remove different discrepancies such as empty rows, inconsistencies and the like.

Feature engineering process 126 may receive as input the structured data from the structure generator 124 and may then measure representative behaviors of the developer, related to each one of the performance metrics and measurements sets 104.

According to some embodiments, the output of the feature engineering process 126 may be represented as an analysis-based table (ABT), such the one discussed below in further details in conjunction with FIG. 4.

In an embodiment where the data is unlabeled, the approach applied may be the unsupervised approach, as shown in FIG. 2, proceeding with unsupervised machine learning. Performance analysis 128 may use the performance scoring scale 106 and the performance levels 108 to convert the measured behaviors into unitless values. For example, a data scientist may choose the performance scoring scaling 106 to be 60-140, and the number of performance levels 108 to be five (5), for example as (very high, high, medium, low) related to productivity metric, (expert, proficient, competent, advanced beginner, novice) related to the expertise metric. The performance analysis 128 may include two stages: a performance scoring stage and a performance rating stage.

Each developer may then be scored by a distribution modeling based on the performance scoring scale 106, giving the score of developer in every measurement. According to some embodiments, the average score over all measurements may be calculated. According to other embodiments, the score of the developer may be determined by taking into account a set of performance level weightings 110 in order to single out the importance of the measurement in the eyes of the domain expert in determining the overall developer performance.

Figure 6:
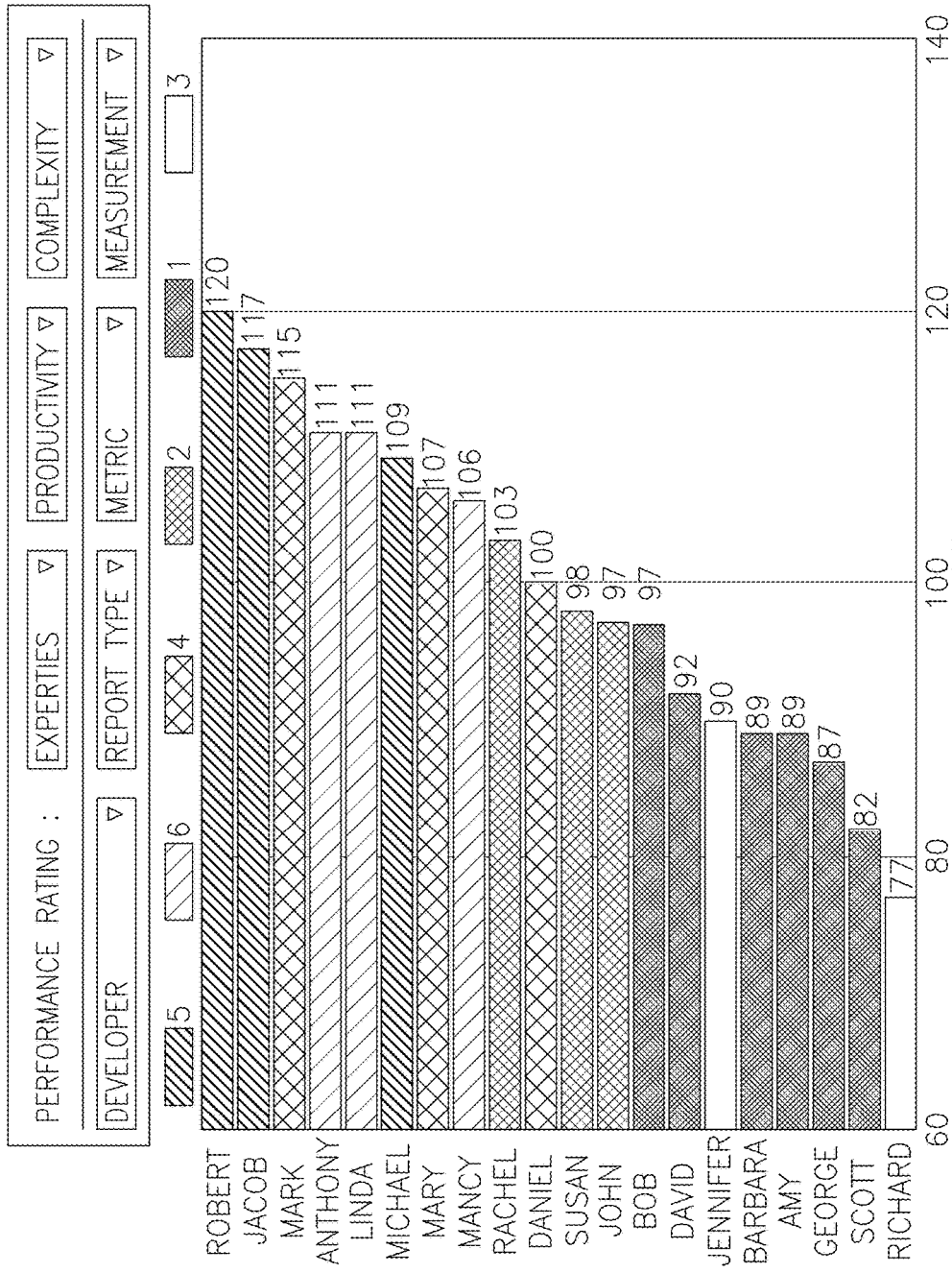
FIG. 6 illustrates one embodiment of a performance rating screen, according to the present invention.

The performance rating may be then performed. The scores may be fed into an unsupervised machine learning algorithm to detect developers that are similar across all the performance metrics 104 that are part of the developer performance conceptual model, for example using K-means algorithm. FIG. 6 illustrates one embodiment of a performance rating screen, according to the present invention, as discussed below in further detail. A score card may be then obtained for each developer, based on the performance levels 108. FIG. 7 illustrates an embodiment of score cards for the expertise metric, and FIG. 8 illustrates an embodiment of score cards for and the productivity metric, according to the present invention and as discussed below in further detail.

Figure 9:
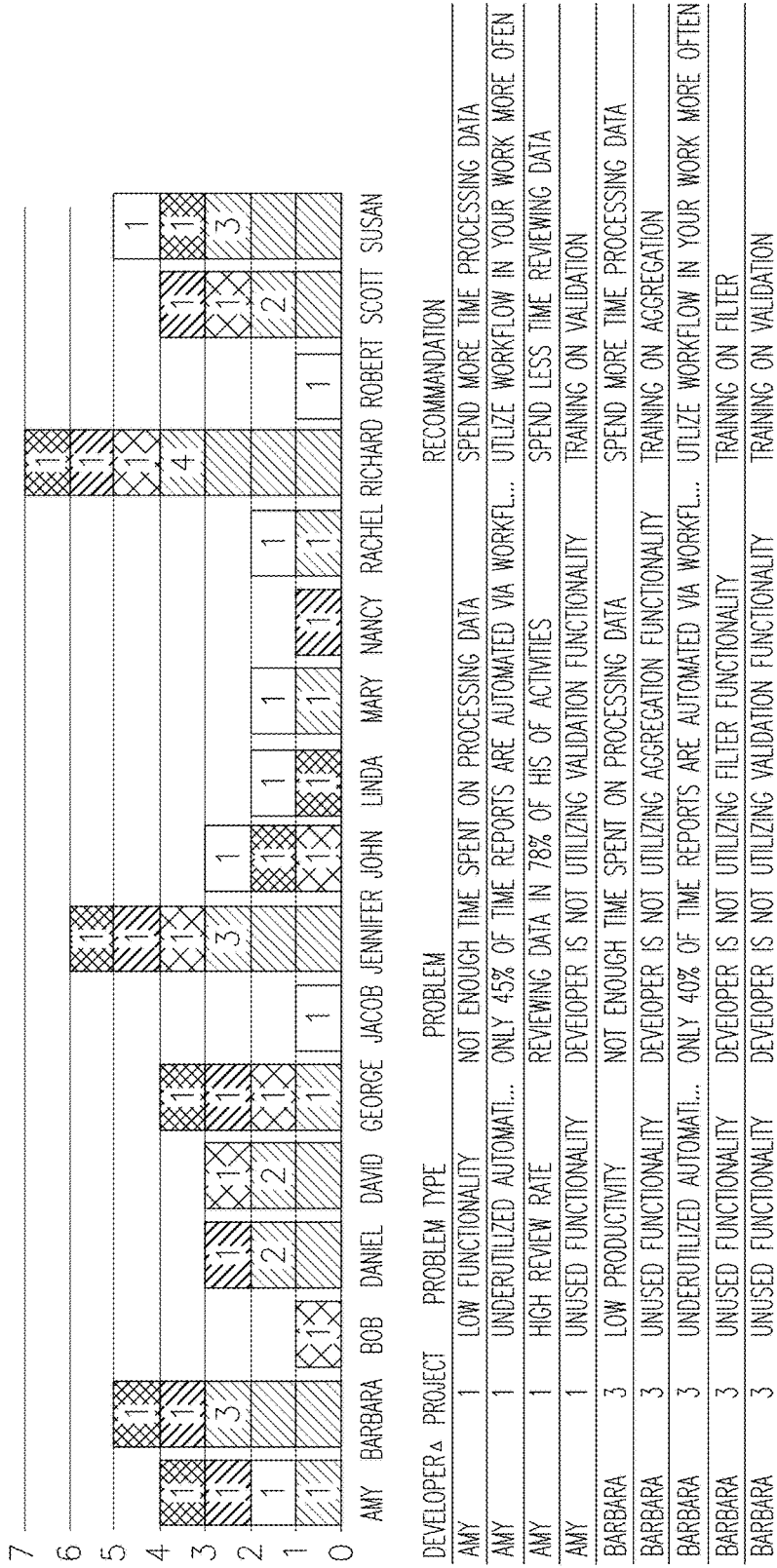
FIG. 9 illustrates one embodiment of performance recommendations for a number of developers, according to the present invention.

In some embodiments, recommendations how the developer may improve his performance for at least one metric may be generated by the recommendation generator 130, based on the scoring performance of the developer calculated by the performance analysis 128 and the performance levels 108. The recommendation generator 130 may use outlier detection and anomaly detection levering correlation analysis. FIG. 9 illustrates one embodiment of performance recommendation for some developers, according to the present invention and as discussed below in further detail.

Figure 3:
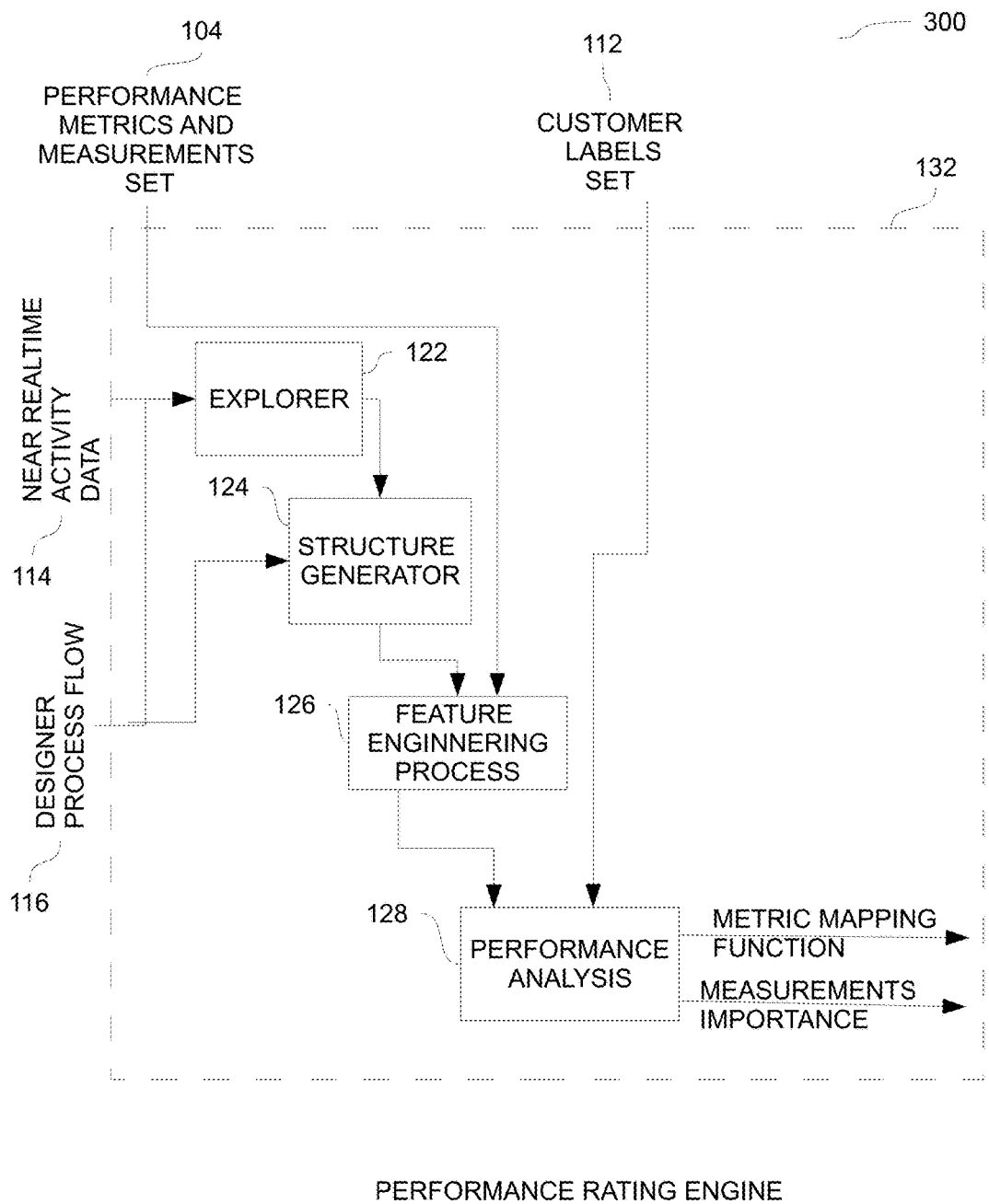
FIG. 3 is a functional block diagram of one embodiment of a performance rating engine of FIG. 1, according to the present invention.

In an embodiment where the data is labeled, the approach applied may be the supervised approach, as shown in FIG. 3. In such a case, a customer may label the developer performance rating by inputting a set customer labels 112. Performance analysis 128 may be performed by using a supervised machine learning algorithm known as a classifier, such as neural network, or boosting or bagging among others. The machine learning may be trained on the data results from the feature engineering process 126 to produce a performance rating function based on the set of customer labels 112. According to some embodiments, the measurements importance may also be determined.

In some embodiments where the data is labeled, the performance analysis 128 may further include a performance scoring stage, similar to as described previously.

FIG. 4 illustrates one embodiment of an analysis base table 400, for a developer named Robert, according to the present invention. As shown, each column in the analysis table represents an entity, such as activity ID, content ID, action, content type, unique content ID, among others, and each row represents an observation.

FIG. 5 illustrates one embodiment of a performance scoring table, according to the present invention. As shown, each column may refer to a measurement being part of the set of performance metrics and measurements 104, such as automation (related to the expertise metric, compliance (related to the complexity metric), among others and each row may refer to a developer. As shown, the scoring is based on the performance scoring scale 106, which is designated to be 60-140 in this example.

FIG. 6 illustrates one embodiment of a performance rating screen, according to the present invention. On the lower part, it may show the score of each developer. The hatching scheme may correspond to the clusters, such that the K-means algorithm detects. In this embodiment, six distinct groups of developers were detected. The upper part is a set of filters that may dice the data according to any criteria, such as performance measurement, any metric or to a specific developer.

FIG. 7 illustrates one embodiment of a developer scorecard 700, for a developer named David, for a metric named expertise, and recommendation generated for the developer David, according to the present invention. The upper part may represent the performance scoring related to the expertise metric, and each row may represent the performance scoring related to each measurement being included in the expertise metric. The lower part may represent the recommendation generated by the recommendation generator 130.

FIG. 8 illustrates one embodiment of a developer scorecard 800, for a developer named Barbara, for a metric named productivity, and recommendation generated for the developer Barbara, according to the present invention. The upper part may represent the performance scoring related to the productivity metric, each row may represent the performance scoring related to each measurement being included in the productivity metric. The lower part may represent the recommendation generated by the recommendation generator 130.

FIG. 9 illustrates one embodiment of performance recommendations for some developers, according to the present invention. For each developer, per project, the problem type may be exposed, and recommendations may be generated for each of the problem type, by the recommendation generator 130.

Figure 10:
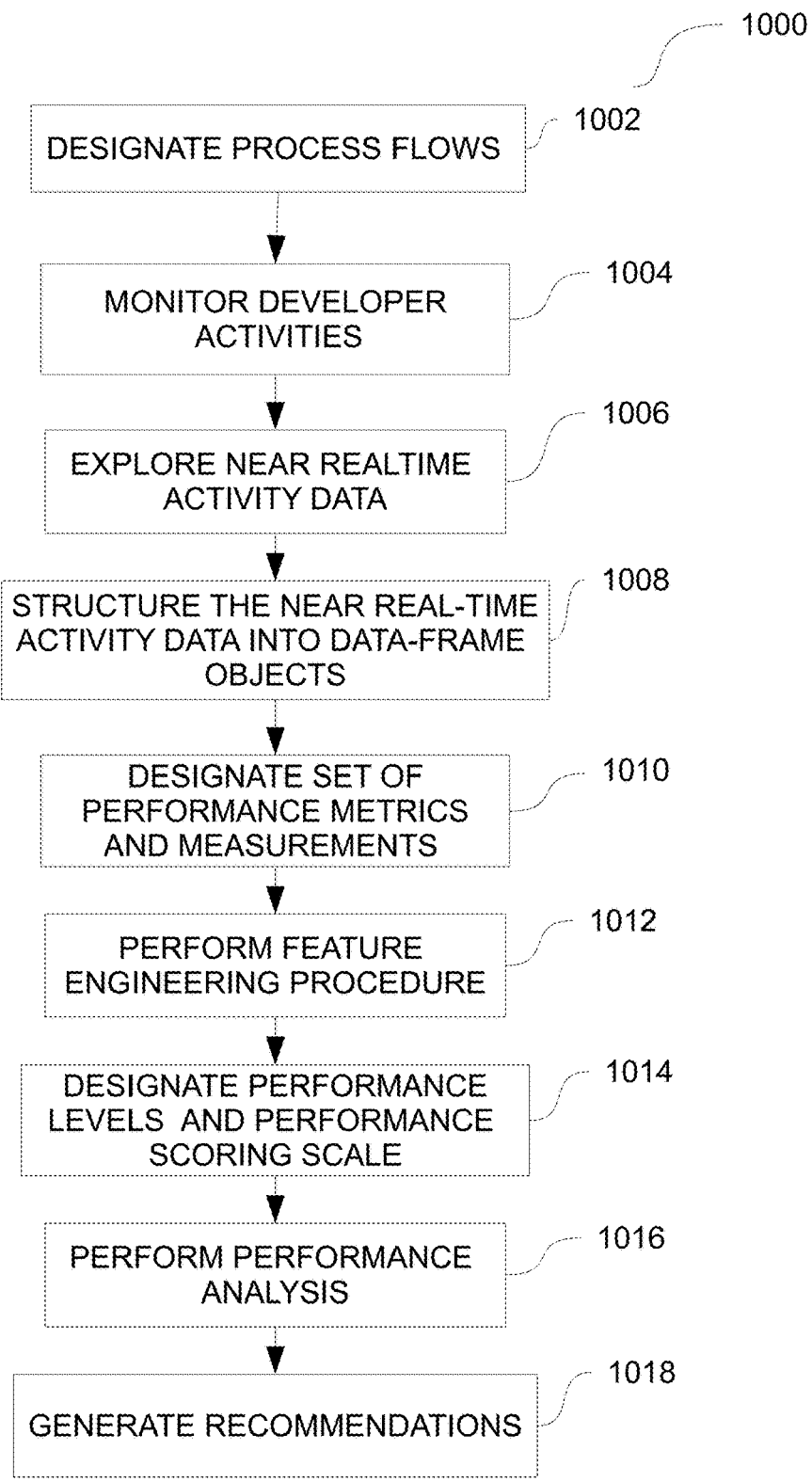
FIG. 10 shows a flowchart of method steps for computing a performance rating, according to one embodiment of the present invention.

FIG. 10 shows a flowchart 1000 of method steps for computing a performance rating, according to one embodiment of the present invention.

Although the method steps are described in the context of the system illustrated in FIGS. 1-3, any system configured to perform the method steps is within the scope of the present invention.

As shown in FIG. 10, in step 1002, the domain expert may designate process-flows specific to a development process 116.

In step 1004, developer activities may be monitored to obtain near real-time activity data 114 related to the developer.

In step 1006, the near real-time activity data 114 may be explored based on the process-flows 116 to obtain identify the main entities that participate in the development process, such as different types of activities, objects to be developed, and the outputs that were created.

In step 1008, near real-time activity data 114 may be structured into data-frame objects based on the identified identities. According to some embodiments, a cleansing routine may be part of the structuring process.

As shown in step 1010, a data scientist may designate a set of performance metrics and measurements 104, which forms the basis of the performance rating engine, to reflect factors related to developer performance.

In step 1012, feature engineering procedure 126 may be performed to measure representative behaviors of the developer, related to any measurement and performance metric. According to some embodiments, the output of the feature engineering process 126 may be represented as an analysis-based table (ABT), such as the one discussed below in further detail in conjunction with FIG. 4.

In step 1014, a data scientist may designate performance levels 108 and performance scoring scale 106.

In step 1016, performance analysis 128 may then be applied, to obtain performance rating and scorecard of a developer. FIG. 6 illustrates one embodiment of a performance rating screen, according to the present invention as discussed above in further detail. FIG. 7 and FIG. 8 illustrate an embodiment of score cards for the expertise metric and the productivity metric, according to the present invention and as discussed above in further details.

In step 1018, recommendations may be generated by the recommendation generator 130. FIG. 9 illustrates one embodiment of performance recommendation for some developers, according to the present invention and as discussed above in further detail.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computer implemented method for generating a performance rating for a developer, the method comprising:
    monitoring developer activities to obtain near real-time activity data;
    receiving at least one process-flow specific to a development process;
    exploring the near real-time activity data related to the developer, to identify entities based on the at least one process flow,
    wherein said entities comprise at least one of: activity identifier, content identifier, action, content type, unique content identifier;
    structuring the near real-time activity data into data-frame objects, based on the identified entities;
    receiving at least one performance metric and at least one measurement related to the at least one performance metric,
    wherein said at least one performance metric and at least one measurement metric embody the criteria that is used to rate said developer;
    performing a feature engineering procedure to measure representative behaviors of the developer, related to the at least one measurement and the at least one performance metric;
    receiving a number of performance levels related to the at least one performance metric;
    receiving a performance scoring scale related to the at least one performance metric; and
    performing a performance analysis on the measured representative behaviors to produce performance rating of the developer,
    wherein said performance analysis is carried out based on performance level weightings, associating different levels of importance to respective measurements, in determining an overall performance of the developer.

2. The method according to claim 1, wherein the performance analysis is further producing a score card of the developer.

3. The method according to claim 2, further comprising sending the performance rating and the score card of the developer to a receiving device.

4. The method according to claim 1, further comprising sending the performance rating of the developer to a receiving device.

5. A computer implemented method for generating a performance rating for a developer, the method comprising:
    monitoring developer activities to obtain near real-time activity data;
    receiving at least one process-flow specific to a development process;
    exploring the near real-time activity data related to the developer, to identify entities based on the at least one process flow,
    wherein said entities comprise at least one of: activity identifier, content identifier, action, content type, unique content identifier;
    structuring the near real-time activity data into data-frame objects, based on identified entities;
    receiving at least one performance metric and at least one measurement related to the at least one performance metric, wherein said at least one performance metric and at least one measurement metric embody the criteria that is used to rate said developer;

performing a feature engineering procedure to measure representative behaviors of the developer, related to the at least one measurement and the at least one performance metric;

receiving a set of labels, the labels representing the developer performance rating, the set of labels provided by a customer; and performing a performance analysis on the measured representative behaviors to produce a performance rating mapping function based on the set of labels and obtaining importance of the measurements, wherein said performance analysis is carried out based on performance level weightings, associating different levels of importance to respective measurements, in determining an overall performance of the developer.

6. The method according to claim 2, further comprising generating performance recommendations relevant to the developer.

7. The method of claim 6, further comprising sending the scorecard, the performance rating and the performance recommendations relevant to the developer, to a receiving device.

8. The method of claim 5, further comprising:
receiving a number of performance levels related to the at least one performance metric;
receiving a performance scoring scale related to the at least one performance metric; and
generating performance recommendations relevant to the developer,
wherein the performance analysis is further comprising a performance scoring.

9. The method of claim 8, further comprising sending the scorecard, and the performance recommendations relevant to the developer to a receiving device.

10. A non-transitory computer readable storage medium storing a set of instructions for causing a computer to generate a performance rating for a developer, by performing the operations of:
monitoring developer activities to obtain near real-time activity data;
receiving at least one process-flow specific to a development process;
exploring the near real-time activity data related to said developer, to identify entities based on the at least one process flow,
wherein said at least one performance metric and at least one measurement metric embody the criteria that is used to rate said developer;
structuring the near real-time activity data into data-frame objects, based on the identified entities;
receiving at least one performance metric and at least one measurement related to the at least one performance metric,
wherein said at least one performance metric and at least one measurement metric embody the criteria that is used to rate said developer;
performing a feature engineering procedure to measure representative behaviors of the developer, related to the at least one measurement and the at least one performance metric;
receiving a number of performance levels related to the at least one performance metric;
receiving a performance scoring scale related to the at least one performance metric; and
performing a performance analysis on the measured representative behaviors to produce a performance rating of the developer,
wherein said performance analysis is carried out based on performance level weightings, associating different levels of importance to respective measurements, in determining an overall performance of the developer.

11. The non-transitory computer readable storage medium of claim 10, wherein the performance analysis is further producing a scorecard of the developer.

12. The non-transitory computer readable storage medium of claim 10 further performing the operation of generating performance recommendations relevant to the developer.

13. A non-transitory computer readable storage medium storing a set of instructions for causing a computer to generate a performance rating for a developer, by performing the operations of:
monitoring developer activities to obtain near real-time activity data;
receiving at least one process-flow specific to a development process;
exploring the near real-time activity data related to said developer, to identify entities based on the at least one process flow,
wherein said at least one performance metric and at least one measurement metric embody the criteria that is used to rate said developer;
structuring the near real-time activity data into data-frame objects, based on the identified entities;
receiving at least one performance metric and at least one measurement related to the at least one performance metric;
performing a feature engineering procedure to measure representative behaviors of the developer, related to the at least one measurement and the at least one performance metric;
receiving a set of labels, the set of labels representing the developer performance rating, the set of labels provided by a customer; and
performing a performance analysis on the measured representative behaviors to produce a performance rating mapping function based on the set of labels and obtaining importance of the measurements,
wherein said performance analysis is carried out based on performance level weightings, associating different levels of importance to respective measurements, in determining an overall performance of the developer.

14. The non-transitory computer readable storage medium of claim 13 further performing the operations of:
receiving a number of performance levels related to the at least one performance metric;
receiving a performance scoring scale related to the at least one performance metric; and
generating performance recommendations relevant to the developer,
wherein the performance analysis is further comprising a performance scoring.

* * * * *